United States Patent Office 3,600,447
Patented Aug. 17, 1971

3,600,447
PREPARATION OF HYDROXYLATED AROMATIC COMPOUNDS
Jerome A. Vesely, Park Ridge, Ill., assignor to Universal Oil Products Company, Des Plaines, Ill.
No Drawing. Filed Dec. 20, 1965, Ser. No. 515,142
The portion of the term of the patent subsequent to Oct. 22, 1985, has been disclaimed
Int. Cl. C07c 39/00, 39/08, 39/10
U.S. Cl. 260—621                                    8 Claims

ABSTRACT OF THE DISCLOSURE

Preparation of a hydroxylated aromatic compound by treating a t-alkyl substituted aromatic compound with $H_2O_2$ in the presence of a Friedel-Crafts catalyst at a temperature of $-10°$ C. to $100°$ C.

---

This invention relates to a process for the preparation of hydroxylated aromatic compounds, and more particularly to a process for preparing hydroxylated aromatic compounds via hydroxylation accompanied by an alkyl transfer reaction.

Aromatic compounds which contain one or more hydroxyl substituents on the aromatic ring will find a wide variety of uses in the chemical field. For example, phenol is an important intermediate in the preparation of phenolic resins, epoxy resins, nylon, weed killers, as a selective solvent for refining lubricating oils, salicylic acid, picric acid, germicidal paints, and pharmaceuticals. Hydroxynaphthalene which is also known as alpha-naphthol or beta-naphthol is used in dyes, synthetic perfumes, pigments, anti-oxidants for rubber, fats, oils, insecticides or in organic synthesis of fungicides, pharmaceutics and perfumes.

Dihydroxylated aromatics such as hydroquinone, catechol, dihydroxynaphthalene, etc., find a wide variety of uses in the chemical field. For example, hydroquinone is an important chemical which is utilized in photographic developers, in dye intermediates, in medicine, as an antioxidant for fats and oils, as an inhibitor in coating compounds for rubber, stone and textiles, in paints and varnishes, as well as in motor fuels and oils. In addition, it is an intermediate for preparing mono- and dibenzyl ethers of hydroquinone, the latter compounds being used in perfumes, plastics and pharmaceuticals. Catechol finds a wide variety of uses as an antiseptic, in photography, dyestuffs, antioxidants and light stabilizers; furthermore, it is an intermediate for the preparation of the dimethyl ether of catechol which is used as an antiseptic and for the monomethyl ether of catechol which is guaiacol, guaiacol being an important component of many medicines.

Hydroquinone is ordinarily prepared by oxidizing aniline to quinone utilizing manganese dihydroxide and thereafter reducing the quinone to hydroquinone. Likewise, catehcol is usually prepared by fusion of o-phenol-sulfonic acid with caustic potash at a relatively high temperature of about 350° C. or by heating guaiacol with hydriodic acid. This latter step is somewhat expensive and time consuming inasmuch as guaiacol is prepared by the somewhat intricate process system of extracting beechwood creosote with alcoholic potash, washing with ether, crystallizing the potash compound with alcohol and decomposing the compound with dilute sulfuric acid; or guaiacol can be obtained by diazotization of o-anisidine followed by dilute sulfuric acid.

Polyhydroxylated aromatic compounds such as pyrogallol (1,2,3-trihydroxybenzene) may be used as a protective colloid in the preparation of metallic colloidal solutions, in photography, dyes, synthetic drugs, process engraving, antioxidants in lubricating oils, etc. Phloroglucinol (1,3,5-trihydroxybenzene) is used in analytical chemistry, medicines and in the preparation of pharmaceuticals, dyes and resins.

In view of the importance of the aforementioned hydroxylated aromatic compounds, the necessity of obtaining these compounds by relatively inexpensive procedures is of importance to the chemical industry. It is therefore an object of this invention to provide an improved process for obtaining hydroxylated aromatic compounds.

A further object of this invention is to provide process for preparing hydroxylated aromatic compounds utilizing starting materials which are readily available in accomplishing the desired result in a simple one-step process which includes an alkyl transfer reaction.

In one aspect, an embodiment of this invention resides in a process for the preparation of a hydroxylated aromatic compound which comprises treating a t-alkyl-substituted aromatic compound with hydrogen peroxide in the presence of a Friedel-Crafts catalyst at hydroxylation conditions, and recovering the resultant hydroxylated aromatic compounds.

A specific embodiment of this invention is found in a process for the preparation of hydroxylated aromatic compounds which comprises treating t-butylbenzene with an aqueous solution of hydrogen peroxide in which said hydrogen peroxide is present in the aqueous solution in an amount of from about 5% to about 90% at a temperature in the range of from about 0° to about 40° C. and ambient pressure in the presence of boron trifluoride, and recovering the resultant phenol, hydroquinone and catechol.

Other objects and embodiments will be found in the following further detailed description of this invention.

As hereinbefore set forth, the present invention is directed to a process for preparing hydroxylated aromatic compounds via hydroxylation accompanied by alkyl transfer, said process being accomplished by treating a t-alkyl-substituted aromatic compound with hydrogen peroxide in the presence of a Friedel-Crafts catalyst at hydroxylation conditions hereinafter set forth in greater detail.

Examples of t-alkyl-substituted aromatic compounds which may be utilized as starting materials in the process of this invention include both mono- and polycyclic aromatic compounds containing a tertiary alkyl substituent, said tertiary alkyl substituent containing from 4 to about 20 carbon atoms and preferably containing from 4 to about 8 carbon atoms. Specific examples of these t-alkyl-substituted aromatic hydrocarbons which may be used include t-butyl-benzene,
p-t-butyltoluene,
di-t-butylbenzene,
p-t-amyltoluene,
t-amylbenzene,
t-hexylbenzene,
t-heptylbenzene,
t-octylbenzene,
p-t-butylphenol,
p-t-amylphenol,
p-t-hexylphenol,
o-t-butylphenol,
o-t-amylphenol,
t-butylnaphthalene,
t-amylnaphthalene,
t-hexylnaphthalene,
t-heptylnaphthalene,
t-octylnaphthalene,
1-t-butyl-2-naphthol,
1-t-amyl-2-naphthol, 1-t-hexyl-2-naphthol,
t-butylanthracene,
t-amylanthracene,
t-hexylanthracene,
t-heptylanthracene,
t-octylanthracene,
1-t-butyl-2-anthracol,
1-t-amyl-2-anthracol,
1-t-hexyl-2-anthracol,
t-butylphenanthrene,
t-amylphenanthrene,
t-hexylphenanthrene,
t-heptylphenanthrene,
t-octylphenanthrene,
1-t-butyl-2-phenanthracol,
1-t-amyl-2-phenanthracol,
t-butylchrysene,
t-amylchrysene,
t-hexylchrysene,
t-heptylchrysene,
t-octylchrysene,
1-t-butyl-2-chrysol,
1-t-amyl-2-chrysol,
t-butylpyrene,
t-amylpyrene,
t-hexylpyrene,
t-heptylpyrene,
t-octylpyrene, etc.,
p-t-butylanisole,
p-t-amylanisole,
o-t-butylanisole,
o-t-butylphenetol,
p-t-butylphenetol,
o-t-butylchlorobenzene,
p-t-butylchlorobenzene,
o-t-amylchlorobenzene,
p-t-amylchlorobenzene,
1-t-butyl-2-chloronaphthalene,
1-t-amyl-2-chloronaphthalene,
1,1-bis-(p-t-butylphenyl)-1-desoxy-D-gluticol,
1,1-bis-(o-t-butylphenyl)-1-desoxy-D-gluticol, the corresponding t-alkyl aromatic derivatives of other hexoses such as fructose, sorbose, tagatose, psicose, idose, gulose, talose, etc., glycolaldehyde, trioses, tetraoses, pentoses, etc. It is to be understood that the aforementioned t-alkyl-substituted compounds are only representative of the class of compounds which may be used, and that the present invention is not necessarily limited thereto.

The process of this invention is effected by treating a t-alkyl-substituted aromatic compound of the type hereinbefore set forth in greater detail with hydrogen peroxide in the presence of a Friedel-Crafts catalyst. The hydrogen peroxide which is used may be present in an aqueous solution containing from 5% up to about 90% or more hydrogen peroxide. The preferably hydrogen peroxide solution which is used will contain from about 50% or higher concentration up to about 90% of hydrogen peroxide inasmuch as, when utilizing certain Friedel-Crafts catalysts, the aqueous portion of the solution will tend to affect the catalytic activity of the Friedel-Crafts metal chloride, thus tending to slow down the reaction and eventually cause said reaction to cease. Examples of Friedel-Crafts type catalysts which may be used include boron trifluoride, zinc chloride, aluminum chloride, ferric chloride, zirconium chloride, etc. The preferred catalysts which are used comprise boron trifluoride and zinc chloride inasmuch as said catalysts tolerate appreciable amounts of water before losing catalytic activity. The boron fluoride may be complexed with one molecular proportion of ether or ether organic complexing agent. It is contemplated within the scope of this invention that aluminum chloride, ferric chloride, etc., may also be used. However, when utilizing the latter Friedel-Crafts catalysts it is necessary that an excess of the catalyst be present in the reaction mixture in order to tie up oxygen which is present, there being required one mole of catalyst per one mole of oxygen present.

In addition, the reaction may also require the higher temperature range to effect the hydroxylation of the t-alkyl-substituted aromatic compound. In addition to utilizing an excess of catalyst, it is also necessary to use a more concentrated hydrogen peroxide solution in order to minimize the water present in the reaction mixture, solutions of hydrogen peroxide containing over 90% hydrogen peroxide being necessary. As hereinbefore set forth, the hydroxylation reaction is effected under hydroxylation conditions which will include temperatures ranging from about −10° up to about 100° C. or more and preferably, when utilizing boron trifluoride or zinc chloride as the catalyst at a temperature in the range of from about 0° to about 40° C. The reaction pressure which is utilized will preferably comprise ambient pressure although somewhat higher pressures may be used, the pressure being that which is necessary to maintain a substantial portion of the reactants in the liquid phase.

The obtention of either a major proportion of a monohydroxylated aromatic compound or a major proportion of a polyhydroxylated aromatic compound can be varied according to the amount of tertiary alkyl-substituted aromatic compound which is treated with the hydrogen peroxide. For example, if a major proportion of a monohydroxylated aromatic compound is desired, an excess of the t-alkyl-substituted aromatic compound will be used. Conversely, if a major proportion of a polyhydroxylated aromatic compound comprises the desired product the relative amount of hydrogen peroxide which is used will be increased. Generally speaking, the t-alkyl-substituted aromatic compound will be present in a mole ratio in the range of from about 3:1 to about 15:1 moles of t-alkyl-substituted aromatic compound per mole of hydrogen peroxide, although greater or lesser amounts of aromatic compound may also be used.

The process of the present invention may be effected in any suitable manner and may comprise either a batch or continuous type of operation. For example, when a batch type operation is used, a quantity of the tertiary-alkyl-substituted aromatic compound is placed in an appropriate apparatus, such as or example, a stirred autoclave, a long with a Friedel-Crafts type catalyst, the preferred catalysts comprising boron trifluoride and zinc chloride. The hydrogen peroxide is added thereto and the reaction is allowed to proceed for a predetermined residence time under the hydroxylation conditions hereinbefore set forth in greater detail. It is to be understood that the residence time during which the hydroxylation is effected may vary from about 0.5 hour up to about 5 hours or more in duration. It is to be further understood that the amount of catalyst which will be used to effect the reaction of the present invention will vary from catalytic amounts of boron trifluoride and zinc chloride up to an excess over the stoichiometric amount required if aluminum chloride or ferric chloride comprises the Friedel-Crafts catalytic agent. Upon completion of the desired residence time, the reactor is allowed to return to room temperature and the reaction product is thereafter recovered. Following this, the reaction product is subjected to conventional means for recovery, said means including washing the product with an inert organic solvent, flashing off the solvent, and subjecting the reaction product to fractional distillation to recover the desired compounds.

It is also contemplated that the process of this invention may be effected in a continuous type of operation. When such a process is used, the tertiary-alkyl-substituted aromatic compound is continuously charged to the reaction zone which is maintained at the proper operating conditions of temperature and pressure, the reaction zone containing a Friedel-Crafts catalyst of the type hereinbefore set forth. In addition, the hydrogen peroxide in the form of an aqueous solution containing from 5% up to about 90% or more hydrogen peroxide and preferably containing more than 50% hydrogen peroxide is continuously charged to the reaction zone. The reaction is allowed to proceed at a predetermined time ranging from about 0.5 up to about 2 hours or more, following which the reactor effluent is continuously withdrawn. The reaction product is separated from any unreacted starting materials by conventional means and subjected to treatment similar to that hereinbefore set forth to recover the desired hydroxylated aromatic compound.

Examples of hydroxylated aromatic compounds (the term "hydroxylated aromatic compounds" as used in the present specification and appended claims referring to both monohydroxylated and polyhydroxylated aromatic compounds) which may be prepared according to the process of this invention include phenol, hydroquinone, catechol, phloroglucinol, pyrogallol, 1-hydroxynaphthalene, 2-hydroxynaphhalene, 1,4 - dihydroxynaphthalene, 1,5 - dihydroxynaphthalene, 1-hydroxyanthracene, 2-hydroxyanthracene, 1,5-dihydroxyanthracene, C-methylated derivatives of these, etc. It is to be understood that the aforementioned hydroxylated aromatic compounds are only representative of the class of compounds which may be prepared and that the present invention is not necessarily limited thereto.

Inasmuch as the hydroxylation of the aromatic compound is accompanied by an alkyl transfer reaction it is contemplated within the scope of this invention that mixtures of a tertiary-alkyl-substituted aromatic compound and an aromatic compound or of a di-tertiary-substituted alkylaromatic compound and an aromatic compound may be utilized, the aromatic compound such as benzene or naphthalene, etc., acting as an acceptor molecule and transferring the tertiary-alkyl group, thus forming more tertiary-alkyl-substituted aromatic compounds available for possible hydroxylation of the aromatic compound (i.e., recycling). Thus mixtures of t-butylbenzene and benzene, di-t-butyl benzene and benzene, t-amylbenzene and benzene, t-butylnaphthalene and naphthalene, etc., may serve for the starting materials for the process of this invention.

It is significant to note that the present process offers means of converting benzene, for example, to phenol via a Friedel-Crafts catalyzed reaction with hydrogen peroxide. For example, treatment of benzene as such with hydrogen peroxide in the presence of boron trifluoride or other Friedel-Crafts type catalysts yields very little if any phenol. On the other hand, if benzene is first alkylated to produce t-alkylbenzene and the latter is then treated with hydrogen peroxide and a Friedel-Crafts catalyst such as boron trifluoride in the presence or absence of benzene, there is produced a high yield of phenol with t-alkylbenzene and di-t-alkyl-benzene, respectively.

The following examples are given to illustrate the process of the present invention which, however, are not intended to limit the generally broad scope of the present invention in strict accordance therewith.

EXAMPLE I

Into a stainless steel turbomixer autoclave containing 75 g. of boron trifluoride is added 268 g. (2.0 mole) of t-butylbenzene. The autoclave is sealed and 21.9 g. of a 50% aqueous hydrogen peroxide solution is gradually charged to the reactor during a period of about 30 minutes. The mixture is then stirred for an additional period of 10 minutes, the temperature during the 40 minutes of contact time being maintained in a range of from about 0° to about 6° C. by means of an external ice bath in which the autoclave is immersed.

At the end of the contact time, the autoclave is opened and the reaction product is transferred to a beaker. The reactor parts are washed with benzene, the washing being then added to the reaction product. The solution is then decanted into another beaker, a small amount of an aqueous phase containing a benzene-insoluble product separating out during the decanting step. The decanted benzene solution is extracted with aqueous alkali and distilled, thereby separating di-t-butylbenzene therefrom. The aqueous alkali solution is acidified with hydrochloric acid and ether extracted. Following this, the ether is distilled from the extract thereby leaving a residue which contains a mixture of phenol, catechol, hydroquinone and traces of t-butylbenzene, said composition being determined by infra-red analysis.

EXAMPLE II

In this example, 316 g. (2.0 mole) of t-amylbenzene is placed in an autoclave which is maintained at a temperature in the range of from about 0° to about 6° C. by being immersed in an ice bath. In addition, the autoclave also contains 75 g. of boron trifluoride. The autoclave is sealed and 25 g. of a 50% hydrogen peroxide solution are added thereto, the addition of the hydrogen peroxide being accomplished during a period of about 30 minutes. At the end of this time, the contents are stirred for an addiitonal 10 minutes while maintaining the temperature in the aforementioned range. At the end of the desired residence time, the autoclave is opened and the reaction product is treated in a manner similar to that set forth in Example I above. Analysis by means of an infra-red and gas-liquid chromatograph will disclose the presence of phenol, catechol and hydroquinone as well as di-t-amylbenzene in the aqueous alkali portion of the solution.

EXAMPLE III

In this example, 40.5 g. (0.21 mole) of p-di-t-butylbenzene, 65 g. (0.83 mole) of benzene and 75 g. of boron trifluoride are placed in an autoclave and treated with 22 g. of a 30% hydrogen peroxide solution. The autoclave is maintained at a temperature in the range of from about 0° to about 60° C. while adding the hydrogen peroxide during a period of about 50 minutes. Upon completion of the addition of the hydrogen peroxide the reaction mixture is then stirred for a period of 10 minutes, thus making the total contact time 1 hour in duration. The reaction product is recovered upon opening the autoclave and treated in a manner similar to that set forth in Example I above, that is, extracted with aqueous alkali and distilled to recover mono- and di-t-butylbenzene. The alkali-soluble product will be found by infra-red analysis to consist of phenol, catechol, hydroquinone and t-butylphenol.

EXAMPLE IV

To an autoclave which contains 50 g. of zinc chloride, is added 368 g. (2.0 mole) of 1-t-butylnaphthalene. Following this, 22 g. of a 30% aqueous hydrogen peroxide solution is added to the autoclave during a period of about 30 minutes, said autoclave being maintained at a temperature in the range of from about 50° to about 60° C. by means of an external heater. Upon completion of the addition of the hydrogen peroxide, the reaction mixture is stirred for an additional period of 15 minutes, following which the autoclave is opened and the reaction product recovered. Infra-red and gas-liquid chromatographic analysis will disclose the presence of hydroxynaphthalene, 1,2-dihydroxynaphthalene and di-t-butylnaphthalene.

EXAMPLE V

In this experiment, a mixture of 396 g. (2.0 mole) of 1-t-amylnaphthalene and 75 g. of boron trifluoride are treated with 22 g. of a 30% aqueous hydrogen peroxide solution in an autoclave maintained at a temperature in the range of from about 0° to about 60° C., during a total contact time of about 1 hour, the addition of the hydrogen peroxide being accomplished in a manner similar to that hereinbefore set forth. After recovery of the product and treatment in a manner similar to that set forth in Example I above, infra-red and gas-liquid chromatographic analysis will disclose the presence of hydroxynaphthalene, dihydroxynaphthalene and di-t-amylnaphthalene.

What is claimed is:

1. A process for the preparation of a hydroxylated aromatic compound which comprises gradually adding an aqueous hydrogen peroxide solution containing from about 5% to about 90% $H_2O_2$ to a mono-t-alkyl or di-t-alkyl substituted aromatic compound selected from the group consisting of aromatic hydrocarbons, nuclearly substituted aromatic hydrocarbons in which the nuclear substituent is hydroxyl, lower alkoxy or chlorine, said t-alkyl substituent(s) being attached to an aromatic ring of said compound and containing from 4 to about 20 carbon atoms, in the presence of a Friedel-Crafts catalyst selected from the group consisting of boron trifluoride and zinc chloride, at a temperature of from about $-10°$ C. to about $100°$ C. and a pressure sufficient to maintain a substantial portion of the reactants in the liquid phase, and recovering the resultant hydroxylated aromatic compounds, the latter being devoid of said t-alkyl substituent(s) and having one or two hydroxyl groups per molecule introduced by the hydroxylation reaction.

2. The process as set forth in claim 1, further characterized in that said Friedel-Crafts catalyst is boron trifluoride.

3. The process as set forth in claim 1, further characterized in that said Friedel-Crafts catalyst is zinc chloride.

4. The process as set forth in claim 1, further characterized in that said t-alkyl-substituted aromatic compound is t-butylbenzene and said hydroxylated aromatic compounds comprise phenol, hydroquinone and catechol.

5. The process as set forth in claim 1, further characterized in that said t-alkyl-substituted aromatic compound is t-amylbenzene and said hydroxylated aromatic compounds comprise phenol, hydroquinone and catechol.

6. The process as set forth in claim 1, further characterized in that said t-alkyl-substituted aromatic compound is t-butylnaphthalene and said hydroxylated aromatic compounds comprise monohydroxynaphthalene and dihydroxynaphthalenes.

7. The process as set forth in claim 1, further characterized in that said t-alkyl-substituted aromatic compound is t-amylnaphthalene and said hydroxylated aromatic compounds comprise monohydroxynaphthalene and dihydroxynaphthalenes.

8. The process as set forth in claim 1, further characterized in that said t-alkyl-substituted aromatic compound is p-di-t-butylbenzene and said hydroxylated aromatic compounds comprise phenol, hydroquinone and catechol.

References Cited

UNITED STATES PATENTS

| | | | |
|---|---|---|---|
| 2,700,689 | 1/1955 | McCaulay et al. | 260—672TX |
| 3,377,386 | 4/1968 | Chafetz | 260—621 |
| 3,407,237 | 10/1968 | Vesely | 260—621 |

OTHER REFERENCES

McClure et al.: J. Org. Chem., vol. 27, pp. 24–26 (1962).

Lacey: Ind. and Eng. Chem., vol. 46, No. 9, pp. 1827–29 (1954).

Copisarow: J. Chem. Soc., 119, pp. 1806–10 (1921).

Olah: Friedel-Crafts and Related Reactions, vol. I, Interscience Publishers, New York, 1963, pp. 26, 27, 319.

L. ZITVER, Primary Examiner

N. MORGENSTERN, Assistant Examiner

U.S. Cl. X.R.

260—209, 613, 619, 623, 624, 671